No. 611,654. Patented Oct. 4, 1898.
H. A. STEVENS.
HORSE RETAINER.
(Application filed Sept. 16, 1897.)
(No Model.)
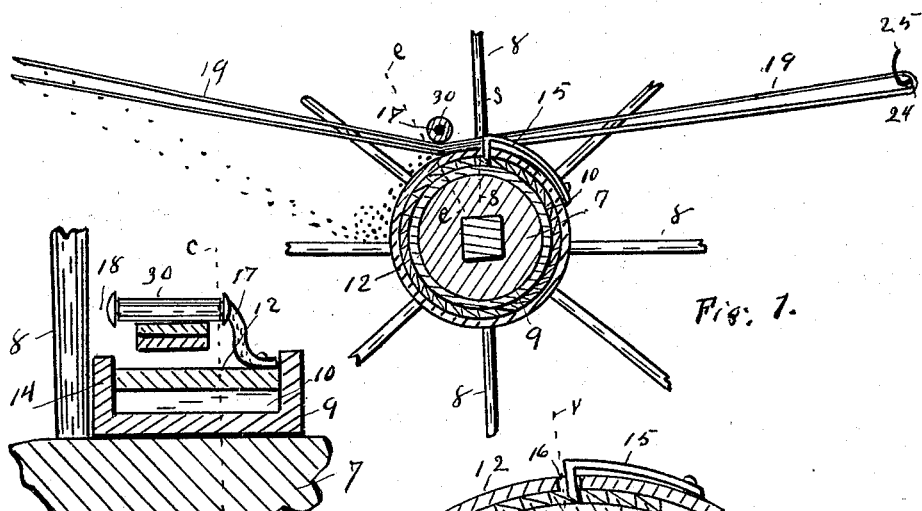
Fig. 1.
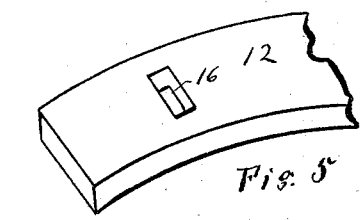
Fig. 2.
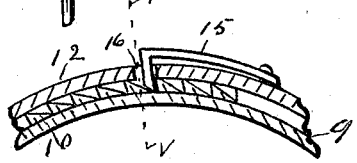
Fig. 3.
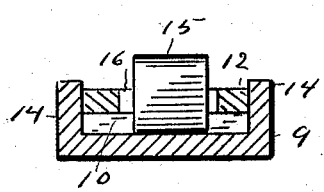
Fig. 4.
Fig. 5.
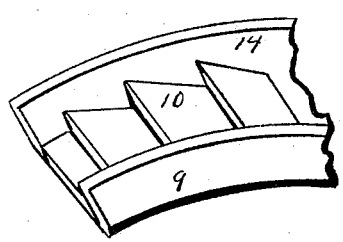
Fig. 6.
Witnesses
Levi F. Cod
Jacob Dykehouse
Inventor
Henry A. Stevens
By his Attorney Lucius C. West.
THE NORRIS PETERS CO., PHOTO-LITHO., WASHINGTON, D. C.

UNITED STATES PATENT OFFICE.

HENRY A. STEVENS, OF KALAMAZOO, MICHIGAN.

HORSE-RETAINER.

SPECIFICATION forming part of Letters Patent No. 611,654, dated October 4, 1898.

Application filed September 16, 1897. Serial No. 651,849. (No model.)

*To all whom it may concern:*

Be it known that I, HENRY A. STEVENS, a citizen of the United States, residing at Kalamazoo, in the county of Kalamazoo, State of Michigan, have invented a new and useful Horse-Retainer, of which the following is a specification.

This invention relates to devices for attachment to the wheels of vehicles, which are adapted for engagement with the reins in a manner that if the horse should start the movement of the wheel in starting to revolve will draw on the reins, stopping the horse, and so arranged that if the horse backs up the tension on the reins will be released, all as more particularly set forth and claimed below.

The object of the invention will appear in the following description and claim.

In the drawings forming a part of this specification, Figure 1 is a cross-section of a hub of a wheel, showing the mode of construction and arrangement of two concentric rings or bands in relation with the wheel-hub and mode of operation, the same being in section on line $c\ c$ in Fig. 2. Fig. 2 shows a broken portion of the wheel-hub, with connecting parts enlarged, on dotted lines $e\ e$ in Fig. 1; Fig. 3, enlarged detail from Fig. 1, showing the ratchet and pawl; Fig. 4, an enlarged section on line $s\ s$ in Fig. 1, looking from a point at the left; Fig. 5, an enlarged broken perspective of outer band below fully described, and Fig. 6 is an enlarged broken perspective of the ratchet-band.

Referring to the parts of the drawings pointed out by numerals, 7 is a wheel-hub with its spokes 8 shown broken away, Fig. 1. On the inside of the hub and by the side of the spokes is a band 9, secured rigidly to the hub and being provided on its periphery with ratchet-teeth 10. Concentric with this band 9 and movable thereon is another band 12. It will be observed that the band 9 is flanged up at the edges, as at 14, Figs. 2, 4, and 6, and that the band 12 loosely fits in between these flanges, and thus the band 12 is prevented from lateral displacement. This latter band 12 is provided with a spring-pawl 15, the engaging end of which passes down through a hole 16 in the band and engages the teeth of the ratchet-band 9, as explained in the operation and plainly shown in Fig. 3. The band 12 is also provided with an arm or finger 17, (or any suitable rein-retainer may be substituted,) projecting over toward the spokes, with a clearance 18 to allow the reins 19 to be inserted, as in Figs. 1 and 2. This finger is preferably provided with a roller 30 to better enable the release of the tension on the reins when the horse backs up.

In the operation the driver, after stopping his horse, catches the reins beneath the finger 17, as in Fig. 2, observing first to catch the loop end 24 of said reins over a hook 25 or loop arranged for the purpose, or they may be buckled around any bar or brace of the seat or any suitable part of the vehicle. Fig. 1 shows this adjustment. Now if the horse should start the wheel would revolve, and hence revolve the ratchet-band, and through the engagement of the pawl with the ratchet-teeth the outer band would be revolved forward, carrying the finger 17 over and down, as indicated by the dotted position in Fig. 1, causing a drawing strain on the reins. This causes the horse to stop, and if he backs up the strain is released and the finger raises again, since the ratchet-teeth, being slanting on the back side, slip by the pawl. This hook 25 is to be attached to some convenient portion of the vehicle-body, said body not being here shown, but will be understood.

This is designed as a very convenient retainer for horses that will stand with the ordinary weight-and-strap means of hitching, and thus do away with the trouble of handling a cumbersome weight in and out of the vehicle.

Having thus described my invention, what I claim as new, and desire to secure by Letters Patent of the United States, is—

The combination of a vehicle-wheel, the ratchet-band surrounding the hub on the inside of the spokes and having the flanged-up edges, a band on the ratchet-band loose between said flanged-up edges and provided with a pawl-hole, a spring having one end attached to the outer band and the other end turned down through the pawl-hole, a hook or loop for the attachment thereto of the loop end of the reins, and a finger provided with the antifriction-roller and attached to the outer band in position for catching the reins under said finger and to leave a space for the reins to pass between its end and the spokes of the wheel, substantially as set forth.

In testimony of the foregoing I have hereunto set my hand in the presence of two witnesses.

HENRY A. STEVENS.

Witnesses:
LEVI F. COX,
ROBERT N. PERCY.